(12) United States Patent
Xu et al.

(10) Patent No.: US 12,707,451 B2
(45) Date of Patent: Aug. 11, 2026

(54) CHANNEL TRANSMISSION METHOD, ELECTRONIC DEVICE, AND STORAGR MEDIUM

(71) Applicant: GUANGDONG OPPO MOBILE TELECOMMUNICATIONS CORP., LTD., Dongguan (CN)

(72) Inventors: Weijie Xu, Dongguan (CN); Zhisong Zuo, Dongguan (CN); Chuanfeng He, Dongguan (CN); Shengjiang Cui, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 338 days.

(21) Appl. No.: 18/220,978

(22) Filed: Jul. 12, 2023

(65) Prior Publication Data

US 2023/0354305 A1 Nov. 2, 2023

Related U.S. Application Data

(63) Continuation of application No. PCT/CN2021/071829, filed on Jan. 14, 2021.

(51) Int. Cl.
*H04W 72/1263* (2023.01)
*H04W 72/231* (2023.01)

(52) U.S. Cl.
CPC ..... *H04W 72/1263* (2013.01); *H04W 72/231* (2023.01)

(58) Field of Classification Search
CPC ........................ H04W 72/1263; H04W 72/231
See application file for complete search history.

(56) References Cited

U.S. PATENT DOCUMENTS

| | | | | |
|---|---|---|---|---|
| 2019/0357224 | A1* | 11/2019 | Li | H04L 5/0007 |
| 2021/0099329 | A1 | 4/2021 | Hellfajer et al. | |
| 2021/0250887 | A1* | 8/2021 | Xiong | H04W 48/20 |
| 2022/0116144 | A1 | 4/2022 | Liu | |
| 2022/0225400 | A1* | 7/2022 | Wong | H04W 72/0446 |

FOREIGN PATENT DOCUMENTS

| | | | |
|---|---|---|---|
| CN | 109890076 | A | 6/2019 |
| CN | 111431571 | A | 7/2020 |
| CN | 111669251 | A | 9/2020 |
| WO | 2020135948 | A1 | 7/2020 |
| WO | 2020166696 | A1 | 8/2020 |

OTHER PUBLICATIONS

International Search Report in the international application No. PCT/CN2021/071829, mailed on Oct. 15, 2021. 7 pages with English translation.

(Continued)

*Primary Examiner* — Brian P Cox
(74) *Attorney, Agent, or Firm* — BAYES PLLC

(57) ABSTRACT

A channel transmission method is provided, which includes that: a terminal device determines, according to at least one of the following: protocol convention, information received by the terminal device, a transmission parameter of a first transport block, a joint channel estimation window length, and a slot structure, the number of time domain units mapped by the first transport block.

13 Claims, 4 Drawing Sheets

Determining, by a network device, a number of time domain units mapped by a first transmission block according to at least one of: a protocol, a transmission parameter for the first transmission block, a joint channel estimation window length, or a slot structure

S301

(56) References Cited

OTHER PUBLICATIONS

English translation of the Written Opinion of the International Search Authority in the international application No. PCT/CN2021/071829, mailed on Oct. 15, 2021. 6 pages with English translation.
Huawei et al. 3GPP TSG RAN WG1 Meeting #87 R1-1611662, "Scheduling scheme for slot aggregation", Nov. 18, 2016 (Nov. 18, 2016), section 2. 4 pages.
Huawei et al. 3GPP TSG RAN WG1 Meeting #89 R1-1706901, "TB mapping for slot aggregation", May 19, 2017 (May 19, 2017) section 2. 7 pages.
Huawei et al. 3GPP TSG RAN WG1 Meeting #87 R1-1611222, "DL URLLC multiplexing considerations", Nov. 18, 2016 (Nov. 18, 2016).section 3. 8 pages.
Qualcomm Incorporated, "Potential coverage enhancement techniques for PUSCH", 3GPP TSG-RAN WG1 Meeting #103e e-Meeting, Oct. 26-Nov. 13, 2020 R1-2008626. 14 pages.
Vivo, "Discussion on solutions for PUSCH coverage enhancement", 3GPP TSG RAN WG1 #103-e, R1-2007680, e-Meeting, Oct. 26-Nov. 13, 2020. 9 pages.
Supplementary European Search Report in the European application No. 21918397.7, mailed on Jan. 8, 2024, 10 pages.

* cited by examiner

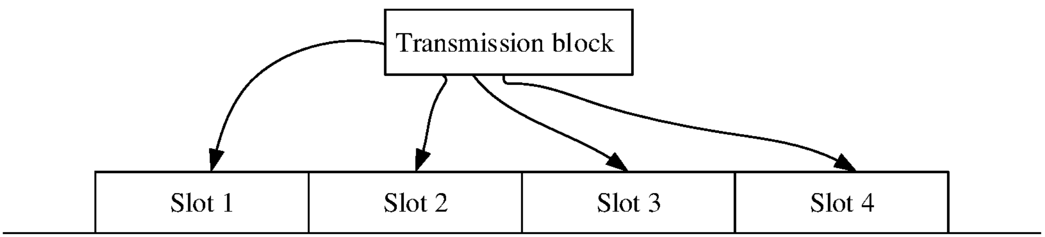
FIG. 1
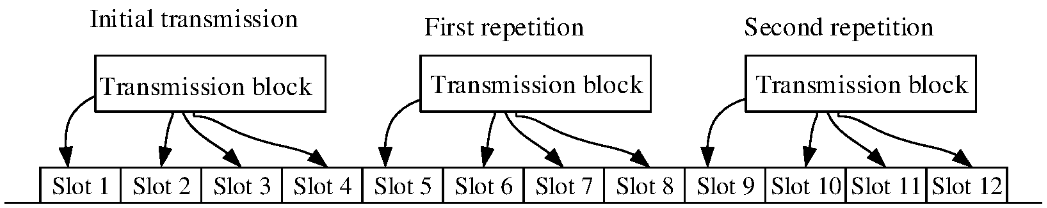
FIG. 2
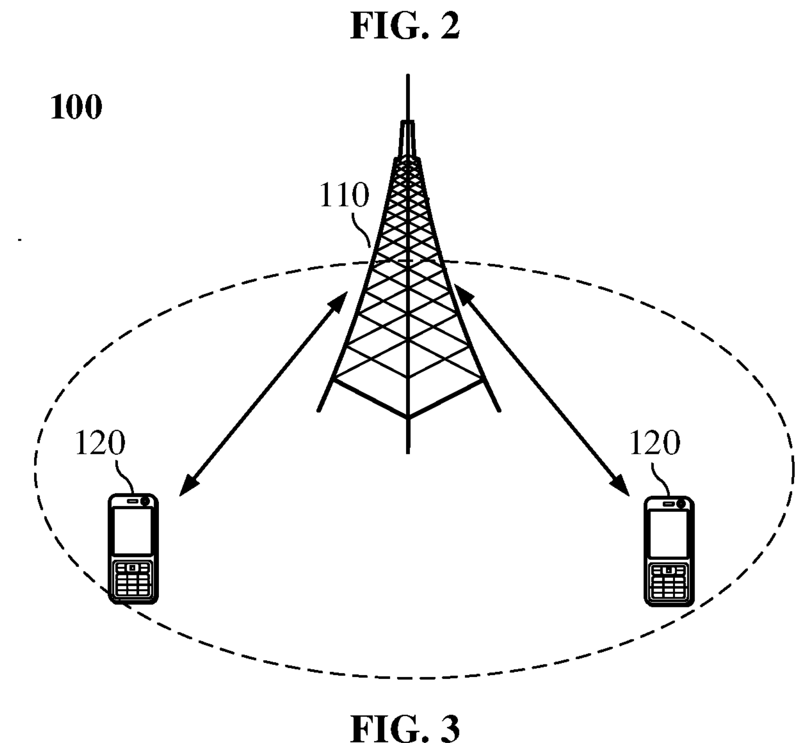
FIG. 3
Determining, by a terminal device, a number of time domain units mapped by a first transmission block according to at least one of: a protocol, information received by the terminal device, a transmission parameter for the first transmission block, a joint channel estimation window length, or a slot structure
S201
FIG. 4

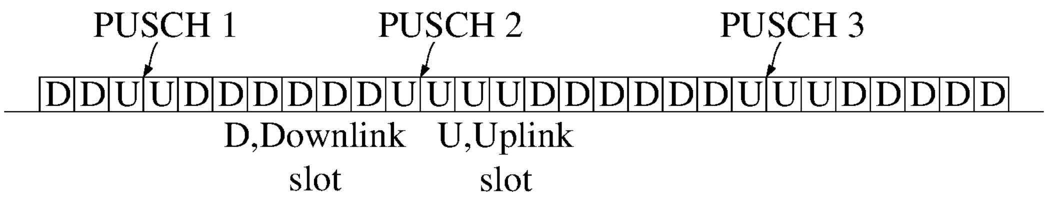

FIG. 5

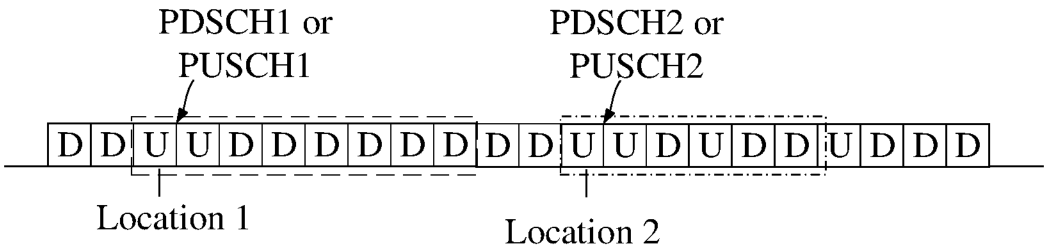

FIG. 6

Determining, by a network device, a number of time domain units mapped by a first transmission block according to at least one of: a protocol, a transmission parameter for the first transmission block, a joint channel estimation window length, or a slot structure — S301

FIG. 7

Transmitting, by a network device, information to a terminal device, the information being used for the terminal device to determine the number of time domain units mapped by the first transmission block — S901

FIG. 8

Network device

Terminal device

S501: A network device determines a number of time domain units mapped by a first transmission block S502: Information S503: The network device maps the first transmission block to a corresponding number of time domain units S504: PDSCH carrying the first transmission block S505: The terminal device detects the PDSCH

CHANNEL TRANSMISSION METHOD, ELECTRONIC DEVICE, AND STORAGR MEDIUM

CROSS-REFERENCE TO RELATED APPLICATION

This is a continuation application of International Patent Application No. PCT/CN2021/071829, filed on Jan. 14, 2021, which is hereby incorporated by reference in its entirety.

BACKGROUND

Since a New Radio (NR) system works in a higher frequency band and a penetration loss of a channel is large, it is always pursued to enhance signal coverage of the NR system.

SUMMARY

The present disclosure relates to the technology field of wireless communication, in particular to a method for a channel transmission, an electronic device and a storage medium.

In embodiments of the present disclosure, there is provided a method for a channel transmission, an electronic device and a storage medium, which can enhance signal coverage of the NR system.

In a first aspect, the embodiments of the present disclosure provide a method for a channel transmission, which includes that: a terminal device determines the number of time domain units mapped by a first transmission block according to at least one of: a protocol, information received by the terminal device, a transmission parameter for the first transmission block, a joint channel estimation window length, or a slot structure.

In a second aspect, the embodiments of the present disclosure provide a terminal device, which includes a first processor. The first processor is configured to determine the number of time domain units mapped by a first transmission block according to at least one of: a protocol, information received by the terminal device, a transmission parameter for the first transmission block, a joint channel estimation window length, or a slot structure.

In a third aspect, the embodiments of the present disclosure provide a network device, which includes a second processor. The second processor is configured to determine the number of time domain units mapped by a first transmission block according to at least one of: a protocol, a transmission parameter for the first transmission block, a joint channel estimation window length, or a slot structure.

BRIEF DESCRIPTION OF THE DRAWINGS

FIG. 1 is a schematic diagram of a transmission block mapped to multiple time domain units for transmission according to an embodiment of the present disclosure.

FIG. 2 is a schematic diagram of repeated transmissions of a transmission block according to an embodiment of the present disclosure.

FIG. 3 is a schematic diagram of a composition structure of a communication system according to an embodiment of the present disclosure.

FIG. 4 is a schematic diagram of an optional processing flow of a method for a channel transmission provided by an embodiment of the present disclosure.

FIG. 5 is a schematic diagram of a slot structure configuration provided by an embodiment of the present disclosure.

FIG. 6 is a schematic diagram of another slot structure configuration provided by an embodiment of the present disclosure.

FIG. 7 is a schematic diagram of another optional processing flow of a method for a channel transmission provided by an embodiment of the present disclosure.

FIG. 8 is a schematic diagram of a detailed optional processing flow of a method for a channel transmission provided by an embodiment of the present disclosure.

DETAILED DESCRIPTION

Figures 9, 10:
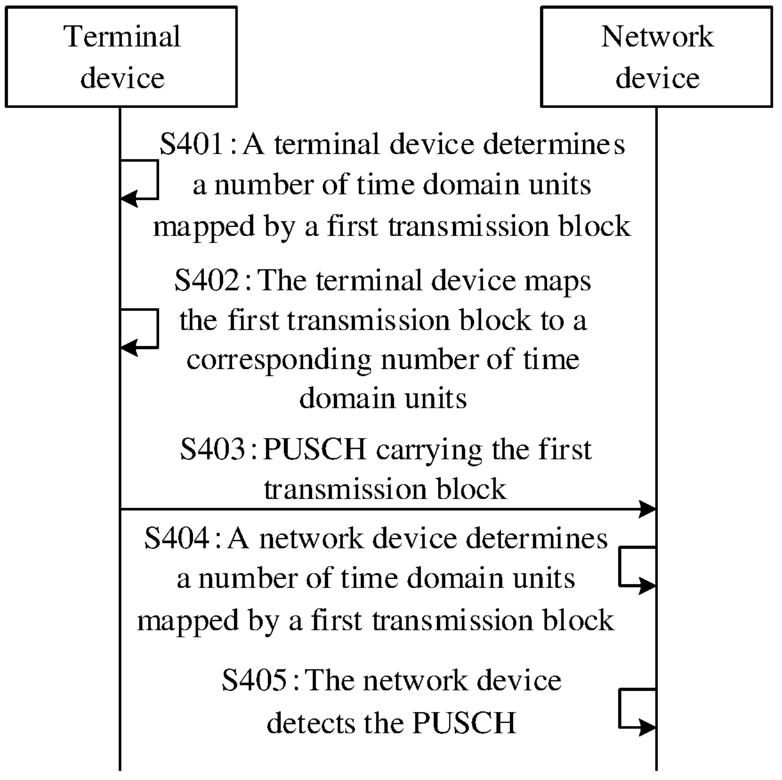
FIG. 9 is a schematic diagram of another detailed optional processing flow of a method for a channel transmission provided by an embodiment of the present disclosure.
FIG. 10 is a schematic diagram of yet another detailed optional processing flow of a method for a channel transmission provided by an embodiment of the present disclosure.

In order to have a more detailed understanding of the features and technical content of the embodiments of the present disclosure, the implementation of the embodiments of the present disclosure will be described in detail below in conjunction with the accompanying drawings, which are provided for illustration only and are not intended to limit the embodiments of the present disclosure.

Before description of embodiments of the present disclosure, related contents are briefly described.

NR system supports a multi-slot Physical Downlink Shared Channel (PDSCH) transmission mechanism and a multi-slot Physical Uplink Shared Channel (PUSCH) transmission mechanism, which can improve a transmission performance of PDSCH and PUSCH and enhance signal coverage.

For the multi-slot PDSCH transmission mechanism in the NR system, if the terminal device is configured with an aggregation factor for downlink (aggregationFactorDL) and the aggregationFactorDL>1, the resource allocation for PDSCH scheduling by the network device can be applied to aggregationFactorDL continuous slots. That is, the same Transmission Block (TB) is repeatedly transmitted in the aggregationFactorDL continuous slots, and a transmission of PDSCH is limited to a transmission of MIMO layer at this time. A redundancy version of TB for a certain repeated transmission can be determined based on the following Table 1.

TABLE 1

| Redundant version of TB | | | | |
|---|---|---|---|---|
| $rv_{id}$ indicated by the DCI scheduling the PDSCH | $rv_{id}$ to be applied to $n^{th}$ transmission occasion | | | |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In the aggregationFactorDL continuous slots for the transmission of PDSCH, if the terminal device determines that slots for repeatedly transmission of PDSCH includes an uplink symbol based on a slot configuration, the terminal ignores PDSCH reception in the slots. This means that the multi-slot PDSCH cannot be transmitted repeatedly in allocated slots including an uplink symbol, but can be transmitted repeatedly in slots including a flexible symbol or a downlink symbol. The flexible symbol can also be called a special symbol.

The multi-slot PUSCH transmission mechanism in the NR system is similar to the multi-slot PDSCH transmission mechanism in the NR system. If the terminal device is configured with an aggregation factor for uplink (aggregationFactorUL) and the aggregationFactorUL>1, the same TB is repeatedly transmitted in the aggregationFactorUL slots. A redundant version of TB for a certain repeated transmission can be determined based on the above Table 1.

In the aggregationFactorUL continuous slots for the transmission of PUSCH, if the terminal device determines that slots for repeatedly transmission of PUSCH includes a downlink symbol based on a slot configuration, the terminal ignores PUSCH transmission in the slots. This means that the multi-slot PUSCH cannot be transmitted repeatedly in allocated slots including a downlink symbol, but can be transmitted repeatedly in slots including a flexible symbol or an uplink symbol.

The present disclosure provides a method of a transmission of multi-slot PUSCH and/or multi-slot PDSCH. As illustrated in FIG. 1, a TB can be mapped to multiple time domain units for transmission to enhance signal coverage. The TB may be carried on PUSCH or PDSCH. The schematic diagram of repeated transmissions of a TB is illustrated in FIG. 2 when the TB is mapped to the multiple time domain units for transmission. The transmission of the TB mapped to the multiple time domain units may be regarded as one transmission, and multiple repeated transmissions can be performed for the one transmission. The present disclosure also provides a method for determining the number of time domain units mapped by a TB.

The technical solution of the embodiments of the present disclosure may be applied to various communication systems. For example, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, a NR-based access to unlicensed spectrum (NR-U) system, a universal mobile telecommunication system (UMTS), a worldwide interoperability for microwave access (WiMAX) communication system, a wireless local area network (WLAN), a wireless fidelity (WiFi), a next generation communication system or other communication systems.

The system architecture and the business scenario described in the embodiments of the present disclosure are intended to more clearly illustrate the technical solution of the embodiment of the present disclosure and do not constitute a limitation to the technical solution provided by the embodiments of the present disclosure. It is known to those skilled in the art that the technical solution provided by the embodiments of the present disclosure is equally applicable to similar technical problems with the evolution of the network architecture and the emergence of new business scenarios.

The network device in the embodiments of the present disclosure may be a common base station (such as NodeB, eNB or gNB), a new radio controller (NR controller), a centralized unit, a new radio base station, a remote radio module, a micro base station, a relay, a distributed unit, a transmission reception point (TRP), a transmission point (TP) or any other device. The embodiments of the present disclosure are not limited to the specific technology and the specific device form adopted by the network device. For convenience of description, in all embodiments of the present disclosure, the above-mentioned apparatus for providing a wireless communication function for a terminal device is collectively referred to as a network device.

In the embodiments of the present disclosure, the terminal device may be any terminal, for example, the terminal device may be a user device for machine-like communication. That is, the terminal device can also be referred to as user equipment (UE), a mobile station (MS), a mobile terminal, a terminal, and the like. The terminal device may communicate with one or more core networks via a radio access network (RAN), for example, the terminal device may be a mobile telephone (or referred to as "cellular" telephone), a computer with a mobile terminal, etc. For example, the terminal device may also be a portable, pocket-sized, hand-held, computer-built or in-vehicle mobile device that exchanges language and/or data with a wireless access network. There is no specific limitation in the embodiments of the present disclosure.

Optionally, the network device and the terminal device may be deployed on land, including indoor or outdoor, hand-held or vehicle-mounted. The terminal device may also be deployed on the water. The terminal device may also be deployed on airplanes, balloons and artificial satellites in the air. Embodiments of the present disclosure are not limited to application scenarios of network devices and terminal devices.

Optionally, communication between a network device and a terminal device, as well as between a terminal device and a terminal device may be carried out through the licensed spectrum, the unlicensed spectrum, or both the licensed spectrum and the unlicensed spectrum simultaneously. Communication between a network device and a terminal device, as well as between a terminal device and a terminal device, may be carried out through a frequency spectrum below 7 Gigahertz (GHz), or above 7 GHz, and may also be carried out by using frequency spectrum below 7 GHz and above 7 GHz simultaneously. Embodiments of the present disclosure are not limited to the spectrum resources used between the network device and the terminal device.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, etc. Embodiments of the present disclosure may also be applied to these communication systems.

Exemplary, FIG. 3 illustrates the communication system 100 to which the embodiments of the present disclosure is applied. The communication system 100 may include a network device 110, which may be a device that communicates with a terminal device 120 (or referred to as a communication terminal or a terminal). The network device 110 may provide communication coverage for a particular geographic area and may communicate with terminal devices located within the coverage area. Optionally, the network device 110 may be a base transceiver station (BTS) in a GSM system or a CDMA system, a NodeB (NB) in a WCDMA system, an evolution NodeB (eNB or eNodeB) in an LTE system, or a wireless controller in a cloud radio access network (CRAN), or the network device can be a mobile switching center, a relay station, an access point, an in-vehicle device, a wearable device, a hub, a switch, a bridge, a router, a network-side device in a 5G network or a network device in a future evolved public land mobile network (PLMN), etc.

The communication system 100 also includes at least one terminal device 120 located within the coverage area of the network device 110. "Terminal device" as used herein includes, but is not limited to: a device connected via a wire line connection, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an Amplitude Modulated-Frequency Modulated (AM-FM) broadcast transmitter; and/or a device of another terminal device arranged to receive/transmit a communication signal; and/or Internet of Things (IoT) devices. A terminal device arranged to communicate through a wireless interface may be referred to as a "wireless communication terminal", "a wireless terminal", or "a mobile terminal". Examples of mobile terminals include but are not limited to satellite or cellular phones; personal communications system (PCS) terminals that can combine cellular radio telephones with data processing, facsimile, and data communication capabilities; personal digital assistant (PDA) that may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal device may refer to an access terminal, user equipment (UE), a user unit, a user station, a mobile radio station, a mobile station, a remote station, a remote terminal, a mobile device, a user terminal, a terminal, a wireless communication device, a user agent, or a user device. The access terminal may be a cellular phone, a cordless phone, a session initiation protocol (SIP) telephone, a wireless local loop (WLL) station, a PDA, a handheld device with wireless communication function, a computing device or other processing device connected to wireless modem, an in-vehicle device, a wearable device, terminal device in 5G network or terminal device in future evolved PLMN, etc.

Optionally, device to device (D2D) communication may be performed between the terminal devices 120.

Optionally, the 5G system or 5G network may also be referred to as a New Radio (NR) system or an NR network.

FIG. 3 exemplarily illustrates one network device and two terminal devices. Optionally, the communication system 100 may include multiple network devices and other numbers of terminal devices may be included within the coverage of each network device, which is not limited by embodiments of the present disclosure.

Optionally, the communication system 100 may also include other network entities such as network controllers, mobility management entities and the like, which are not limited by the embodiments of the present disclosure.

It should be understood that a device having a communication function in a network/system in the embodiments of the present disclosure may be referred to as a communication device. Taking the communication system 100 illustrated in FIG. 3 as an example, the communication device may include a network device 110 and a terminal device 120 having a communication function, the network device 110 and the terminal device 120 may be specific devices described above and will not be described here. The communication device may also include other devices in the communication system 100 such as network controllers, mobility management entities and other network entities, which are not limited in the embodiments of the present disclosure.

An optional processing flow of the method for the channel transmission provided by the embodiments of the present disclosure is illustrated in FIG. 4, which includes the following operation.

At operation S201, a terminal device determines the number of time domain units mapped by a first transmission block according to at least one of: a protocol, information received by the terminal device, a transmission parameter for the first transmission block, a joint channel estimation window length, or a slot structure.

In some embodiments, a time domain unit may be a slot or other time domain unit such as a symbol or a group of symbols. The group of symbols may include at least one symbol. The first transmission block may be carried on PUSCH and or a PDSCH.

First Manner

In some embodiments, the terminal device may determine the number of time domain units mapped by the first transmission block according to the protocol. That is, the protocol is used to specify how many time domain units the first transmission block is mapped to for transmission. In this way, the terminal device can determine the number of time domain units mapped by the first transmission block directly, thereby saving signaling overhead.

Second Manner

In other embodiments, the terminal device may determine the number of time domain units mapped by the first transmission block according to the information received by the terminal device. The information may be transmitted from the network device to the terminal device. The information may include at least one of: Downlink Control Information (DCI), a Radio Resource Control (RRC) signaling or a Media Access Control Control Element (MAC CE). The RRC signaling may be a broadcast message or an RRC dedicated signaling.

In some embodiments, a first information field in the information received by the terminal device is used to indicate the number of time domain units mapped by the first transmission block.

In the specific implementation, a bit value of the first information field may be the number of time domain units mapped by the first transmission block. Taking the information received by the terminal device as DCI for scheduling PUSCH transmission as an example, the DCI includes the first information field, and the bit value of the first information field is the number of time domain units mapped by the first transmission block. For example, if the first information field is three bits, the bit value of the first information field may indicate the number of 1 time domain unit to 7 time domain units. If the bit value of the first information field is "100", the number of time domain units mapped by the first transmission block is 4. If the bit value of the first information field is "110", the number of time domain units mapped by the first transmission block is 6.

In the specific implementation, the bit value of the first information field may also have a correspondence with the number of time domain units mapped by the first transmission block, and the bit value of the first information field is used to indicate the number of time domain units mapped by the first transmission block. For example, numbers of time domain units mapped by the first transmission block corresponding to different bit values of the first information field may be set or configured in advance. As illustrated in Table 2 below, if the bit value of the first information field is "00", the corresponding number of time domain unit mapped by the first transmission block is 1. If the bit value of the first information field is "01", the corresponding number of time domain units mapped by the first transmission block is 2. If the bit value of the first information field is "10", the corresponding number of time domain units mapped by the first transmission block is 4. If the bit value of the first information field is "11", the corresponding number of time domain units mapped by the first transmission block is 8.

TABLE 2

Correspondences between bit values of the first information field and the number of time domain units mapped by TB

| bit values of the first information field | 00 | 01 | 10 | 11 |
|---|---|---|---|---|
| the number of time domain units mapped by TB | 1 | 2 | 4 | 8 |

The above takes the information received by the terminal device being DCI as an example, to describe the terminal device determining the number of time domain units mapped by the first transmission block according to the received information. When the information received by the terminal device is MAC CE or RRC signaling, a processing procedure for the terminal device to determine the number of time domain units mapped by the first transmission block according to the MAC CE or RRC signaling is the same as a processing procedure for the terminal device to determine the number of time domain units mapped by the first transmission block according to the DCI.

In the embodiments of the present disclosure, when the terminal device determines the number of time domain units mapped by the first transmission block according to the DCI, the network device can flexibly indicate the number of time domain units mapped by the first transmission block in real time through the DCI used for scheduling PUSCH. This manner not only has real-time performance, but also can match the available slot structure in time. For example, in a slot structure configuration illustrated in FIG. 5, when a terminal device transmits a PUSCH, PUSCH1 is mapped on two continuous slots instead of mapping on more slots. Since two slots are followed by multiple downlink slots, if PUSCH1 is mapped to more than three continuous slots, the mapped slots will include a downlink slot, and PUSCH cannot be transmitted. For the same reason, PUSCH2 is better mapped on four slots and PUSCH3 is better mapped on three slots.

Therefore, the number of time domain units mapped by the first transmission block is indicated through DCI in the embodiments of the present disclosure, which can match the available slot structure in time, and is beneficial to shorten the transmission delay. Furthermore, the number of time domain units mapped by the first transmission block is indicated through DCI, which can match a channel change of the terminal device in time. For example, when the channel environment is poorer, the first transmission block may be indicated to map to more time domain units. If the channel environment is better, the first transmission block may be indicated to map to fewer time domain units.

The number of time domain units mapped by the first transmission block is indicated through the RRC signaling in the embodiments of the present disclosure, so that a semi-persistent configuration for the number of time domain units mapped by the first transmission block can be realized, thereby saving signaling overhead.

The number of time domain units mapped by the first transmission block is indicated through an MAC CE in the embodiments of the present disclosure, so that the number of time domain units mapped by the first transmission block can be quickly updated, and the signaling overhead also can be saved.

Third Manner

In still other embodiments, the terminal device may determine the number of time domain units mapped by the first transmission block according to the transmission parameter for the first transmission block. The transmission parameter for the first transmission block includes at least one of: a size of the first transmission block, a modulation coding level for a transmission of the first transmission block or a size of a code rate for the transmission of the first transmission block.

In the specific implementation, the transmission parameter for the first transmission block has a correspondence with the number of time domain units mapped by the first transmission block. Taking the transmission parameter for the first transmission block as a size of the transmission block as an example, the correspondences between the sizes of the transmission block and the numbers of time domain units mapped by the transmission block is illustrated in the following Table 3.

TABLE 3

Correspondences between the sizes of the transmission block and the numbers of time domain units mapped by the transmission block

| sizes of the transmission block | less than 50 bits | greater than or equal to 50 bits and less than 100 bits | greater than or equal to 100 bits and less than 200 bits | greater than 200 bits |
|---|---|---|---|---|
| the numbers of slots mapped by the transmission block | 1 | 2 | 4 | 8 |

According to Table 3, if the size of the first transmission block is less than 50 bits, the number of slots mapped by the first transmission block is 1. If the size of the first transmission block is greater than or equal to 50 bits and less than 100 bits, the number of slots mapped by the first transmission block is 2. If the size of the first transmission block is greater than or equal to 100 bits and less than 200 bits, the number of slots mapped by the first transmission block is 4. If the size of the first transmission block is greater than 200 bits, the number of slots mapped by the first transmission block is 8.

The above takes the transmission parameter for the first transmission block being the size of the first transmission block as an example, to describe the terminal device determining the number of time domain units mapped by the first transmission block according to the transmission parameter for the first transmission block. In the specific implementation, if the transmission parameter for the first transmission block is a modulation coding level for a transmission of the first transmission block or a size of a code rate for the transmission of the first transmission block, the correspondences between the modulation coding levels for the transmission block and the numbers of time domain units mapped by the transmission block or correspondences between the sizes of the code rate of the transmission block and the numbers of time domain units mapped by the transmission block may be preset in the same manner as in Table 3. The terminal device determines the number of time domain units mapped by the first transmission block through the correspondences.

Fourth Manner

In still other embodiments, the terminal device may determine the number of time domain units mapped by the first transmission block based on a joint channel estimation window length, and the joint channel estimation window length is the number of time domain units corresponding to a pilot signal for joint channel estimation. In the specific implementation, the number of time domain units mapped by the first transmission block is equal to the joint channel estimation window length.

In the specific implementation, for the multi-slot transmission PUSCH, the network device may configure the terminal device to perform the multi-slot joint channel estimation. The network device may also configure the multi-slot joint channel estimation window length, which is the number of slots of joint channel estimation. In the multi-slot joint channel estimation window, transmission parameters (such as power precoding codebook, beam parameters, etc.) of all slots will be set to be the same, so a receiver may use the joint channel estimation method to estimate the channel. In the embodiments of the present disclosure, if the number of time domain units mapped by the first transmission block is equal to the joint channel estimation window length, the terminal device transmits the first transmission block with the same transmission parameter in multiple slots.

Fifth Manner

In still other embodiments, the number of time domain units mapped by the first transmission block is determined according to a slot structure. In the specific implementation, the terminal device determines that the number of time domain units mapped by the first transmission block is the number of continuous time domain units in the slot structure.

A first time domain unit mapped by the first transmission block is a first time domain unit granted and indicated by a network device for a transmission. Taking another slot structure configuration illustrated in FIG. 6 as an example, a first slot granted and indicated by the network device for transmitting PUSCH by the terminal device is located at location 1, and thus the first time domain unit mapped by the first transmission block is located at location 1.

Optionally, the time domain units mapped by the first transmission block are located within a first number of time domain units starting with a first time domain unit, granted and indicated by a network device for a transmission. Taking another slot structure configuration illustrated in FIG. 6 as an example, if the first number is 8, and a first slot granted and indicated by the network device for transmitting PUSCH by the terminal device is located at location 1, the time domain units mapped by the first transmission block are located within 8 time domain units with location 1 as the starting time domain unit, as illustrated in the dashed box in FIG. 6.

In some alternative embodiments, the number of time domain units mapped by the first transmission block is the number of continuous time domain units in the slot structure. If the terminal device transmits the PUSCH, the number of time domain units mapped by the first transmission block is the number of continuous time domain units for transmitting the PUSCH in the slot structure. As illustrated in FIG. 6, a first slot granted and indicated by the network device for transmitting PUSCH by the terminal device is located at location 1, the time domain units mapped by the first transmission block is within 8 slots with location 1 as the starting slot (as illustrated by the dashed box in FIG. 6), and the 8 slots include 2 continuous uplink slots, then the terminal device determines that the number of slots mapped by the first transmission block (PUSCH1) is 2 instead of being mapped on more than 2 slots. Since 2 slots are followed by multiple downlink slots, if PUSCH2 is mapped to more than 3 continuous slots, the mapped slots will include a downlink slot, and PUSCH cannot be transmitted.

In other alternative embodiments, the number of time domain units mapped by the first transmission block is the number of time domain units that are available for a transmission in the slot structure. Taking transmitting PUSCH as an example, the number of time domain units mapped by the first transmission block is the number of time domain units that are available for transmitting PUSCH in the slot structure. The time domain units that are available for transmitting PUSCH may be continuous or discontinuous. The time domain unit that is available for transmitting the PUSCH may be an uplink slot, or an uplink symbol, or an uplink symbol group, or the like. As illustrated in FIG. 6, a first slot granted and indicated by the network device for transmitting PUSCH by the terminal device is located at location 2, and the time domain units mapped by the first transmission block is within 6 slots with location 2 as the starting time domain unit (as illustrated by the dot-dashed box in FIG. 6). In the 6 slots, the location 2 is taken as the starting slot, 2 continuous uplink slots, 1 downlink slot, 1 uplink slot and 2 downlink slots are included, then the terminal device determines that the number of slots mapped by the first transmission block (PUSCH2) is 3 (i.e., 3 uplink slots). The 3 uplink slots are slots that are available for transmitting PUSCH, and the 3 uplink slots may be discontinuous.

Therefore, the number of time domain units mapped by the first transmission block is determined according the slot structure in the embodiments of the present disclosure, which can match the available slot structure in time, thereby shorting the transmission delay and improving the transmission efficiency.

It should be noted that the first manner to fifth manner used for determining the number of time domain units mapped by the first transmission block in the embodiments of the present disclosure can be applied independently or in combination. The following is some examples of the combined application of first manner to fourth manner. For example, before establishing an RRC connection, the terminal device can determine the number of time domain units mapped by the first transmission block through the protocol in first manner or RRC signaling transmitted by broadcast messages in second manner. After establishing the RRC connection, the terminal device may determine the number of time domain units mapped by the first transmission block through DCI or RRC dedicated signaling in second manner. Of course, there may be other combined manners for determining the number of time domain units mapped by the first transmission block based on the combined application of first manner to fourth manner, which are not limited herein.

In some embodiments, the method further includes the following operation.

At operation S202, the terminal device determines whether to map the first transmission block to at least two time domain units according to the number of time domain units.

In some embodiments, the terminal device determines whether to map the first transmission block to multiple time domain units based on the number of time domain units mapped by the first transmission block determined at operation S201. For example, if the terminal device determines that the number of time domain unit mapped by the first transmission block determined at operation S201 is 1, the terminal device determines to map the first transmission block to one time domain unit. If the terminal device determines that the number of time domain units mapped by the first transmission block determined at operation S201 is N, and N is greater than 1, the terminal device determines to map the first transmission block to N time domain units.

In some embodiments, the method further includes the following operation.

At operation S202', the terminal device determines whether to map the first transmission block to at least two time domain units according to received indication information.

In some embodiments, the network device may transmit indication information to the terminal device, and the indication information may be carried in RRC signaling or DCI. The network device indicates whether the terminal device maps the first transmission block to at least two time domain units through the indication information, which can also be understood that the network device enables the first transmission block to be mapped to multiple time domain units through the indication information.

Another optional processing flow of the method for the channel transmission provided by the embodiments of the present disclosure is illustrated in FIG. 7, which includes the following operation.

At operation S301, a network device determines the number of time domain units mapped by a first transmission block according to at least one of: a protocol, a transmission parameter for the first transmission block, a joint channel estimation window length, or a slot structure.

In some embodiments, a time domain unit may be a slot or other time domain unit such as a symbol or a group of symbols. The group of symbols may include at least one symbol. The first transmission block may be carried on PUSCH and or a PDSCH.

Sixth Manner

In some embodiments, the network device may determine the number of time domain units mapped by the first transmission block according to the protocol. That is, the protocol is used to specify how many time domain units the first transmission block is mapped to for transmission. In this way, the network device can determine the number of time domain units mapped by the first transmission block directly.

Seventh Manner

In other embodiments, the network device may determine the number of time domain units mapped by the first transmission block according to the transmission parameter for the first transmission block. The transmission parameter for the first transmission block includes at least one of: a size of the first transmission block, a modulation coding level for a transmission of the first transmission block or a size of a code rate for the transmission of the first transmission block.

In the specific implementation, the transmission parameter for the first transmission block has a correspondence with the number of time domain units mapped by the first transmission block. Taking the transmission parameter for the first transmission block as a size of the transmission block as an example, the correspondences between the sizes of the transmission block and the numbers of time domain units mapped by the transmission block is illustrated in the above Table 3.

According to Table 3, if the size of the first transmission block is less than 50 bits, the number of slots mapped by the first transmission block is 1. If the size of the first transmission block is greater than or equal to 50 bits and less than 100 bits, the number of slots mapped by the first transmission block is 2. If the size of the first transmission block is greater than or equal to 100 bits and less than 200 bits, the number of slots mapped by the first transmission block is 4. If the size of the first transmission block is greater than 200 bits, the number of slots mapped by the first transmission block is 8.

The above takes the transmission parameter for the first transmission block being the size of the first transmission block as an example, to describe the network device determining the number of time domain units mapped by the first transmission block according to the transmission parameter for the first transmission block. In the specific implementation, if the transmission parameter for the first transmission block is a modulation coding level for a transmission of the first transmission block or a size of a code rate for the transmission of the first transmission block, the correspondences between the modulation coding levels for the transmission block and the numbers of time domain units mapped by the transmission block or correspondences between the sizes of the code rate encoded by the transmission block and the numbers of time domain units mapped by the transmission block may be preset in the same manner as in Table 3. The network device determines the number of time domain units mapped by the first transmission block through the correspondences.

Eighth Manner

In still other embodiments, the network device may determine the number of time domain units mapped by the first transmission block based on a joint channel estimation window length, and the joint channel estimation window length is the number of time domain units corresponding to a pilot signal for joint channel estimation. In the specific implementation, the number of time domain units mapped by the first transmission block is equal to the joint channel estimation window length.

In the specific implementation, for the multi-slot transmission PUSCH, the network device may configure the terminal device to perform the multi-slot joint channel estimation. The network device may also configure the multi-slot joint channel estimation window length, which is the number of slots of joint channel estimation. In the multi-slot joint channel estimation window, transmission parameters (such as power precoding codebook, beam parameters, etc.) of all slots will be set to be the same, so a receiver may use the joint channel estimation method to estimate the channel. In the embodiments of the present disclosure, if the number of time domain units mapped by the first transmission block is equal to the joint channel estimation window length, the network device transmits the first transmission block with the same transmission parameter in multiple slots.

Ninth Manner

In still other embodiments, the number of time domain units mapped by the first transmission block is determined according to a slot structure. In the specific implementation, the network device determines that the number of time domain units mapped by the first transmission block is the number of continuous time domain units in the slot structure.

A first time domain unit mapped by the first transmission block is a first time domain unit granted and indicated by a network device for a transmission. Taking another slot structure configuration illustrated in FIG. 6 as an example, a first slot granted and indicated by the network device for receiving PDSCH by the terminal device is located at location 1, and thus the first time domain unit mapped by the first transmission block is located at location 1.

Optionally, the time domain units mapped by the first transmission block are located within a first number of time domain units starting with a first time domain unit, granted and indicated by a network device for a transmission. Taking another slot structure configuration illustrated in FIG. 6 as an example, if the first number is 8, and a first slot granted and indicated by the network device for receiving PDSCH by the terminal device is located at location 1, the time domain units mapped by the first transmission block are located within 8 time domain units with location 1 as the starting time domain unit.

In some alternative embodiments, the number of time domain units mapped by the first transmission block is the number of continuous time domain units in the slot structure. If the terminal device receives the PDSCH, the number of time domain units mapped by the first transmission block is the number of continuous time domain units for receiving the PDSCH in the slot structure. As illustrated in FIG. 6, a first slot granted and indicated by the network device for receiving PDSCH by the terminal device is located at location 1, and the time domain units mapped by the first transmission block is within 8 slots with location 1 as the starting slot (as illustrated by the dashed box in FIG. 6), and the 8 slots include 6 continuous downlink slots, then the terminal device determines that the number of slots mapped by the first transmission block (PDSCH1) is 6 instead of being mapped on more slots. Since 6 slots are preceded by 2 uplink slots, if PDSCH1 is mapped to more than 7 continuous slots, the mapped slots will include an uplink slot, and PDSCH cannot be transmitted.

In other alternative embodiments, the number of time domain units mapped by the first transmission block is the number of time domain units that are available for a transmission in the slot structure. Taking transmitting PDSCH as an example, the number of time domain units mapped by the first transmission block is the number of time domain units that are available for receiving PDSCH in the slot structure. The time domain units that are available for receiving PDSCH may be continuous or discontinuous. The time domain unit that is available for receiving PDSCH may be a downlink slot, or a downlink symbol, or a downlink symbol group, or the like. As illustrated in FIG. 6, a first slot granted and indicated by the network device for receiving PDSCH by the terminal device is located at location 2, the first number is 6, and the time domain units mapped by the first transmission block is within 6 slots with location 2 as the starting time domain unit (as illustrated by the dot-dashed box in FIG. 6). In the 6 slots, the location 2 is taken as the starting slot, 2 continuous uplink slots, 1 downlink slot, 1 uplink slot and 2 downlink slots are included, then the terminal device determines that the number of slot mapped by the first transmission block (PDSCH2) is 1 (i.e., 1 downlink slot). The downlink slot is a slot that is available for receiving PDSCH by the terminal device.

Therefore, the number of time domain units mapped by the first transmission block is determined according the slot structure in the embodiments of the present disclosure, which can match the available slot structure in time, thereby shorting the transmission delay and improving the transmission efficiency.

It should be noted that the sixth manner to ninth manner used for determining the number of time domain units mapped by the first transmission block in the embodiments of the present disclosure can be applied independently or in combination. Specific combinations are not limited to the embodiments of the present disclosure.

In some embodiments, the method further includes the following operation.

At operation S302, the network device transmits information to a terminal device, the information being used for the terminal device to determine the number of time domain units mapped by the first transmission block.

In some embodiments, the information includes at least one of: Downlink Control Information (DCI), a Radio Resource Control (RRC) signaling and a Media Access Control Control Element (MAC CE).

In some embodiments, a first information field of the information is used to indicate the number of time domain units mapped by the first transmission block.

In the specific implementation, a bit value of the first information field may be the number of time domain units mapped by the first transmission block. Taking the information as DCI for scheduling PUSCH transmission as an example, the DCI includes the first information field, and the bit value of the first information field is the number of time domain units mapped by the first transmission block. For example, if the first information field is three bits, the bit value of the first information field may indicate the number of 1 time domain unit to 7 time domain units. If the bit value of the first information field is "100", the number of time domain units mapped by the first transmission block is 4. If the bit value of the first information field is "110", the number of time domain units mapped by the first transmission block is 6.

In the specific implementation, the bit value of the first information field may also have a correspondence with the number of time domain units mapped by the first transmission block, and the bit value of the first information field is used to indicate the number of time domain units mapped by the first transmission block. For example, the numbers of time domain units mapped by the first transmission block corresponding to different bit values of the first information field may be set or configured in advance. As illustrated in Table 2 above, if the bit value of the first information field is "00", the corresponding number of time domain unit mapped by the first transmission block is 1. If the bit value of the first information field is "01", the corresponding number of time domain units mapped by the first transmission block is 2. If the bit value of the first information field is "10", the corresponding number of time domain units mapped by the first transmission block is 4. If the bit value of the first information field is "11", the corresponding number of time domain units mapped by the first transmission block is 8.

The above takes the information transmitted by the network device being DCI as an example, to describe the number of time domain units mapped by the first transmission block. When the information transmitted by the network device is MAC CE or RRC signaling, a processing procedure for the terminal device to determine the number of time domain units mapped by the first transmission block according to the MAC CE or RRC signaling is the same as a processing procedure for the terminal device to determine the number of time domain units mapped by the first transmission block according to the DCI.

In the embodiments of the present disclosure, when the terminal device determines the number of time domain units mapped by the first transmission block according to the DCI, the network device can indicate flexibly the number of time domain units mapped by the first transmission block in real time through the DCI used for scheduling PUSCH. This manner not only has real-time performance, but also can match the available slot structure in time.

Therefore, the number of time domain units mapped by the first transmission block is indicated through DCI in the embodiments of the present disclosure, which can match the available slot structure in time, and is beneficial to shorten the transmission delay. Furthermore, the number of time domain units mapped by the first transmission block is indicated through DCI, which can match a channel change of the terminal device in time. For example, when the channel environment is poorer, the first transmission block may be indicated to map to more time domain units. If the channel environment is better, the first transmission block may be indicated to map to fewer time domain units.

The number of time domain units mapped by the first transmission block is indicated through the RRC signaling in the embodiments of the present disclosure, so that a semi-persistent configuration for the number of time domain units mapped by the first transmission block can be realized, thereby saving signaling overhead.

The number of time domain units mapped by the first transmission block is indicated through an MAC CE in the embodiments of the present disclosure, so that the number of time domain units mapped by the first transmission block can be quickly updated, and the signaling overhead also can be saved.

In some embodiments, the method further includes the following operation.

At operation S303, the network device determines whether to map the first transmission block to at least two time domain units according to the number of time domain units.

In some embodiments, the network device determines whether to map the first transmission block to multiple time domain units based on the number of time domain units mapped by the first transmission block determined at operation S301. For example, if the network device determines that the number of time domain unit mapped by the first transmission block determined at operation S301 is 1, the network device determines to map the first transmission block to one time domain unit. If the network device determines that the number of time domain units mapped by the first transmission block determined at operation S301 is N, and N is greater than 1, the network device determines to map the first transmission block to N time domain units.

Another optional processing flow of the method for the channel transmission provided by the embodiments of the present disclosure is illustrated in FIG. 8, which includes the following operation.

At operation S901, the network device transmits information to a terminal device, the information being used for the terminal device to determine the number of time domain units mapped by the first transmission block.

In some embodiments, the information includes at least one of: DCI, an RRC signaling and an MAC CE.

In some embodiments, a first information field of the information is used to indicate the number of time domain units mapped by the first transmission block.

In the specific implementation, a bit value of the first information field may be the number of time domain units mapped by the first transmission block. Taking the information as DCI for scheduling PUSCH transmission as an example, the DCI includes the first information field, and the bit value of the first information field is the number of time domain units mapped by the first transmission block. For example, if the first information field is three bits, the bit value of the first information field may indicate the number of 1 time domain unit to 7 time domain units. If the bit value of the first information field is "100", the number of time domain units mapped by the first transmission block is 4. If the bit value of the first information field is "110", the number of time domain units mapped by the first transmission block is 6.

In the specific implementation, the bit value of the first information field may also have a correspondence with the number of time domain units mapped by the first transmission block, and the bit value of the first information field is used to indicate the number of time domain units mapped by the first transmission block. For example, the numbers of time domain units mapped by the first transmission block corresponding to different bit values of the first information field may be set or configured in advance. As illustrated in Table 2 above, if the bit value of the first information field is "00", the corresponding number of time domain unit mapped by the first transmission block is 1. If the bit value of the first information field is "01", the corresponding number of time domain units mapped by the first transmission block is 2. If the bit value of the first information field is "10", the corresponding number of time domain units mapped by the first transmission block is 4. If the bit value of the first information field is "11", the corresponding number of time domain units mapped by the first transmission block is 8.

The above takes the information transmitted by the network device being DCI as an example, to describe the number of time domain units mapped by the first transmission block. When the information transmitted by the network device is MAC CE or RRC signaling, a processing procedure for the terminal device to determine the number of time domain units mapped by the first transmission block according to the MAC CE or RRC signaling is the same as a processing procedure for the terminal device to determine the number of time domain units mapped by the first transmission block according to the DCI.

In the embodiments of the present disclosure, when the terminal device determines the number of time domain units mapped by the first transmission block according to the DCI, the network device can indicate flexibly the number of time domain units mapped by the first transmission block in real time through the DCI used for scheduling PUSCH. This manner not only has real-time performance, but also can match the available slot structure in time.

Therefore, the number of time domain units mapped by the first transmission block is indicated through DCI in the embodiments of the present disclosure, which can match the available slot structure in time, and is beneficial to shorten the transmission delay. Furthermore, the number of time domain units mapped by the first transmission block is indicated through DCI, which can match a channel change of the terminal device in time. For example, when the channel environment is poorer, the first transmission block may be indicated to map to more time domain units. If the channel environment is better, the first transmission block may be indicated to map to fewer time domain units.

The number of time domain units mapped by the first transmission block is indicated through the RRC signaling in the embodiments of the present disclosure, so that a semi-persistent configuration for the number of time domain units mapped by the first transmission block can be realized, thereby saving signaling overhead.

The number of time domain units mapped by the first transmission block is indicated through an MAC CE in the embodiments of the present disclosure, so that the number of time domain units mapped by the first transmission block can be quickly updated, and the signaling overhead also can be saved.

Taking the first transmission block carried on the PUSCH as an example, a detailed optional processing flow of the method for the channel transmission provided by embodiments of the present disclosure is illustrated in FIG. 9, which includes at least the following operations.

At operation S401, a terminal device determines the number of time domain units mapped by a first transmission block according to at least one of: a protocol, information received by the terminal device, a transmission parameter for the first transmission block, or a joint channel estimation window length.

At operation S402, the terminal device maps, according to the determined number of time domain units mapped by the first transmission block, the first transmission block to the corresponding number of time domain units.

At operation S403, the terminal device transmits a PUSCH carrying the first transmission block.

At operation S404, a network device determines the number of time domain units mapped by a first transmission block according to at least one of: a protocol, a transmission parameter for the first transmission block, or a joint channel estimation window length.

At operation S405, the network device detects the PUSCH according to the determined number of the time domain units.

Taking the first transmission block carried on the PDSCH as an example, a detailed optional processing flow of the method for the channel transmission provided by embodiments of the present disclosure is illustrated in FIG. 10, which includes at least the following operations.

At operation S501, a network device determines the number of time domain units mapped by a first transmission block according to at least one of: a protocol, a transmission parameter for the first transmission block, or a joint channel estimation window length.

At operation S502, the network device transmits information to a terminal device, the information being used for the terminal device to determine the number of time domain units mapped by the first transmission block.

At operation S503, the network device maps, according to the determined number of time domain units mapped by the first transmission block, the first transmission block to the corresponding number of time domain units.

At operation S504, the network device transmits a PDSCH carrying the first transmission block.

At operation S505, the terminal device detects the PDSCH according to an indication from the network device.

Figure 11:
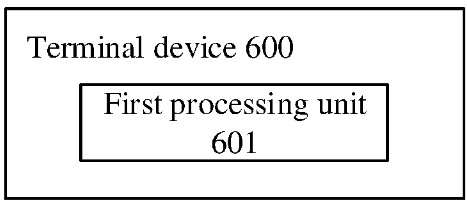
FIG. 11 is a schematic diagram of an optional composition structure of a terminal device provided by an embodiment of the present disclosure.

In order to realize the above method for the channel transmission provided by the embodiments of the present disclosure, there is also provided a terminal device in the embodiments of the present disclosure. An optional composition structure diagram of the terminal device 600 is illustrated in FIG. 11. The terminal device includes a first processing unit 601.

The first processing unit 601 is configured to determine the number of time domain units mapped by a first transmission block according to at least one of:

a protocol, information received by the terminal device, a transmission parameter for the first transmission block, or a joint channel estimation window length.

In some embodiments, the information received by the terminal device 600 includes at least one of: DCI, an RRC signaling and an MAC CE.

Accordingly, the terminal device 600 may further include a receiving unit 602 configured to receive the information.

In some embodiments, a first information field in the information received by the terminal device 600 is used to indicate the number of time domain units mapped by the first transmission block.

In some embodiments, a bit value of the first information field is the number of time domain units mapped by the first transmission block.

In some embodiments, a bit value of the first information field is used to indicate the number of time domain units mapped by the first transmission block.

In some embodiments, a bit value of the first information field has a correspondence with the number of time domain units mapped by the first transmission block.

In some embodiments, the transmission parameter for the first transmission block includes at least one of:

a size of the first transmission block, a modulation coding level for a transmission of the first transmission block or a size of a code rate for the transmission of the first transmission block.

In some embodiments, the transmission parameter for the first transmission block has a correspondence with the number of time domain units mapped by the first transmission block.

In some embodiments, the number of time domain units mapped by the first transmission block is equal to the joint channel estimation window length.

In some embodiments, the joint channel estimation window length is the number of time domain units corresponding to a pilot signal for joint channel estimation.

In some embodiments, the number of time domain units mapped by the first transmission block is the number of continuous time domain units in the slot structure.

In some embodiments, the number of time domain units mapped by the first transmission block is the number of time domain units that are available for a transmission in the slot structure.

In some embodiments, a first time domain unit mapped by the first transmission block is a first time domain unit granted and indicated by a network device for a transmission.

In some embodiments, the time domain units mapped by the first transmission block are located within a first number of time domain units starting with a first time domain unit, granted and indicated by a network device for a transmission.

In some embodiments, a time domain unit includes a slot.

In some embodiments, the first transmission block is carried on a PUSCH and/or a PDSCH.

In some embodiments, the first processing unit 601 is further configured to determine whether to map the first transmission block to at least two time domain units according to the number of time domain units.

In some embodiments, the first processing unit 601 is further configured to determine whether to map the first transmission block to at least two time domain units according to received indication information.

Figure 12:
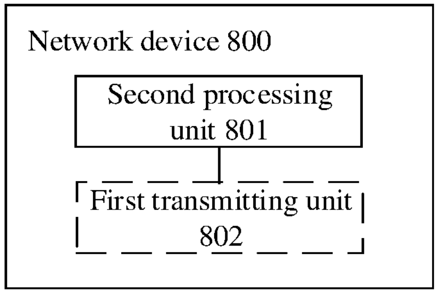
FIG. 12 is a schematic diagram of an optional composition structure of a network device provided by an embodiment of the present disclosure.

In order to realize the above method for the channel transmission provided by the embodiments of the present disclosure, there is also provided a network device in the embodiments of the present disclosure. An optional composition structure diagram of the network device 800 is illustrated in FIG. 12. The network device includes a second processing unit 801.

The second processing unit 801 is configured to determine the number of time domain units mapped by a first transmission block according to at least one of:

- a protocol, a transmission parameter for the first transmission block, or a joint channel estimation window length.

In some embodiments, the transmission parameter for the first transmission block includes at least one of:

- a size of the first transmission block, a modulation coding level for a transmission of the first transmission block or a size of a code rate for the transmission of the first transmission block.

In some embodiments, the transmission parameter for the first transmission block has a correspondence with the number of time domain units mapped by the first transmission block.

In some embodiments, the number of time domain units mapped by the first transmission block is equal to the joint channel estimation window length.

In some embodiments, the joint channel estimation window length is the number of time domain units corresponding to a pilot signal for joint channel estimation.

In some embodiments, the network device 800 further includes a first transmitting unit 802.

The first transmitting unit 802 is configured to transmit information to a terminal device, the information being used for the terminal device to determine the number of time domain units mapped by the first transmission block.

In some embodiments, the information includes at least one of: DCI, an RRC signaling and an MAC CE.

In some embodiments, a first information field of the information is used to indicate the number of time domain units mapped by the first transmission block.

In some embodiments, a bit value of the first information field is the number of time domain units mapped by the first transmission block.

In some embodiments, a bit value of the first information field is used to indicate the number of time domain units mapped by the first transmission block.

In some embodiments, a bit value of the first information field has a correspondence with the number of time domain units mapped by the first transmission block.

In some embodiments, the number of time domain units mapped by the first transmission block is the number of continuous time domain units in the slot structure.

In some embodiments, the number of time domain units mapped by the first transmission block is the number of time domain units that are available for a transmission in the slot structure.

In some embodiments, a first time domain unit mapped by the first transmission block is a first time domain unit granted and indicated by a network device for a transmission.

In some embodiments, the time domain units mapped by the first transmission block are located within a first number of time domain units starting with a first time domain unit, granted and indicated by a network device for a transmission.

In some embodiments, a time domain unit includes a slot.

In some embodiments, the first transmission block is carried on at least one of a PUSCH or a PDSCH.

In some embodiments, the second processing unit 801 is further configured to determine whether to map the first transmission block to at least two time domain units according to the number of time domain units.

Figure 13:
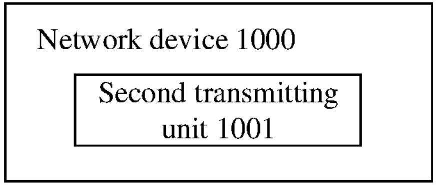
FIG. 13 is a schematic diagram of another optional composition structure of a network device provided by an embodiment of the present disclosure.

In order to realize the above method for the channel transmission provided by the embodiments of the present disclosure, there is also provided a network device in the embodiments of the present disclosure. Another optional composition structure diagram of the network device 1000 is illustrated in FIG. 13. The network device includes a second transmitting unit 1001.

The second transmitting unit 1001 is configured to transmit information to a terminal device, the information being used for the terminal device to determine the number of time domain units mapped by the first transmission block.

In some embodiments, the information includes at least one of: DCI, an RRC signaling and an MAC CE.

In some embodiments, a first information field of the information is used to indicate the number of time domain units mapped by the first transmission block.

In some embodiments, a bit value of the first information field is the number of time domain units mapped by the first transmission block.

In some embodiments, a bit value of the first information field is used to indicate the number of time domain units mapped by the first transmission block.

In some embodiments, a bit value of the first information field has a correspondence with the number of time domain units mapped by the first transmission block.

In some embodiments, a time domain unit includes a slot.

In some embodiments, the first transmission block is carried on at least one of a PUSCH or a PDSCH.

In some embodiments, the second transmitting unit 1001 is further configured to determine whether to map the first transmission block to at least two time domain units according to the number of time domain units.

It should be noted that in the embodiments of the present disclosure, the functions of the first processing unit 601 and the second processing unit 801 can be realized by a processor, the functions of the first transmitting unit 802 and the second transmitting unit 1001 can be realized by a transmitter or transceiver, and the function of the receiving unit 602 can be realized by a receiver or transceiver.

There is also provided a terminal device in the embodiments of the present disclosure, which includes a processor and a memory for storing a computer program capable of running on the processor. The processor is configured to execute the computer program to implement the operations of the above method for the channel transmission performed by the terminal device.

There is also provided a network device in the embodiments of the present disclosure, which includes a processor and a memory for storing a computer program capable of running on the processor. The processor is configured to execute the computer program to implement the operations of the above method for the channel transmission performed by the network device.

There is also provided a chip in the embodiments of the present disclosure. The chip includes a processor for calling and running a computer program in a memory, which causes a device equipped with the chip to implement the above method for the channel transmission performed by the terminal device.

There is also provided a chip in the embodiments of the present disclosure. The chip includes a processor for calling and running a computer program in a memory, which causes a device equipped with the chip to implement the above method for the channel transmission performed by the network device.

There is also provided a storage medium in the embodiments of the present disclosure, the storage medium having stored thereon an executable program that, when being executed by a processor, implements the method for the channel transmission performed by the terminal device.

There is also provided a storage medium in the embodiments of the present disclosure, the storage medium having stored thereon an executable program that, when being executed by a processor, implements the method for the channel transmission performed by the network device.

There is also provided a computer program product in the embodiments of the present disclosure, the computer program product including computer program instructions that cause a computer to implement the method for the channel transmission performed by the terminal device.

There is also provided a computer program product in the embodiments of the present disclosure, the computer program product including computer program instructions that cause a computer to implement the method for the channel transmission performed by the network device.

There is also provided a computer program in the embodiments of the present disclosure, here the computer program causes a computer to implement the method for the channel transmission performed by the terminal device.

There is also provided a computer program in the embodiments of the present disclosure, here the computer program causes a computer to implement the method for the channel transmission performed by the network device.

Figure 14:
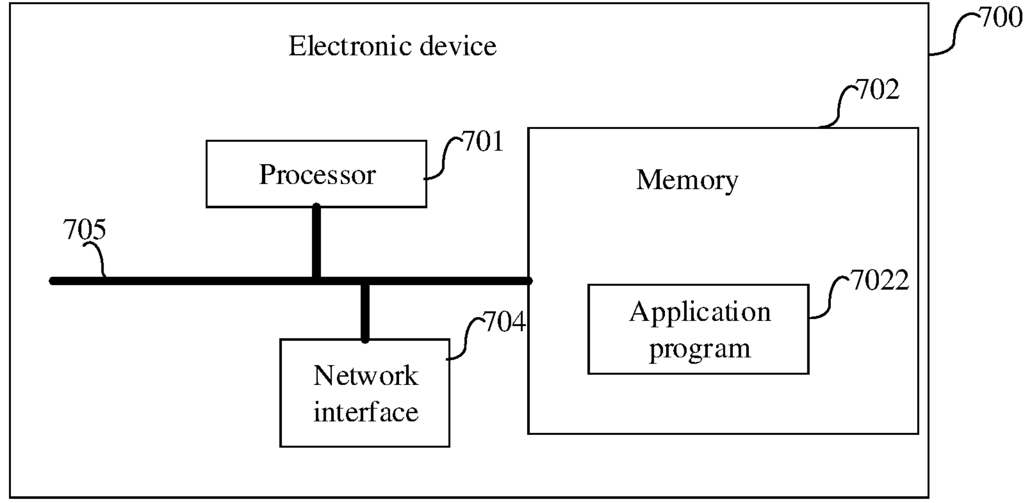
FIG. 14 is a schematic diagram of a hardware composition structure of an electronic device provided by an embodiment of the present disclosure.

FIG. 14 is a schematic diagram of a hardware composition structure of an electronic device (a terminal device or a network device) according to an embodiment of the present disclosure. The electronic device 700 includes at least one processor 701, a memory 702 and at least one network interface 704. The various components in the electronic device 700 are coupled together by a bus system 705. It can be understood that the bus system 705 is used to implement connection communication between these components. The bus system 705 includes a power bus, a control bus and a status signal bus in addition to a data bus. But for clarity, the various buses are designated the bus system 705 in FIG. 14.

It will be appreciated that the memory 702 may be a volatile memory or a non-volatile memory, and may also include both the volatile memory and the non-volatile memory. The non-volatile memory can be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk, or a compact disc read-only memory (CD-ROM). The magnetic surface memory may be a disk memory or a magnetic tape memory. The volatile memory may be a random access memory (RAM), which serves as an external cache. By way of illustration but not limitation, many forms of RAM are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), a direct rambus random access memory (DRRAM). The memory 702 described in the embodiments of the present disclosure is intended to include but not limited to these and any other suitable types of memory.

The memory 702 in the embodiments of the present disclosure is used to store various types of data to support the operation of the electronic device 700. Examples of such data include any computer program for operation on the electronic device 700 such as an application program 7022. A program implementing the method of the embodiments of the present disclosure may be included in the application program 7022.

The methods disclosed in the above embodiments of the present disclosure may be applied to or implemented by the processor 701. The processor 701 may be an integrated circuit chip having signal processing capability. In implementation, the operations of the above method may be accomplished by integrated logic circuitry of hardware or instructions in the form of software in the processor 701. The processor 701 described above may be a general purpose processor, a digital signal processor (DSP), other programmable logic device, a discrete gate or a transistor logic device, a discrete hardware component or the like. The processor 701 may implement or execute the methods, operations and logic diagrams disclosed in the embodiments of the present disclosure. The general purpose processor may be a microprocessor or any conventional processor. The operations of the method disclosed in the embodiments of the application can be directly embodied as the completion of the execution of the hardware decoding processor or the completion of the combined execution of the hardware and software modules in the decoding processor. The software module may be located in a storage medium, the storage medium is located in the memory 702, and the processor 701 reads the information in the memory 702 to complete the operations of the aforementioned methods in conjunction with its hardware.

In an exemplary embodiment, the electronic device 700 may be implemented by one or more application specific integrated circuits (ASIC), DSP, programmable logic device (PLD), complex programmable logic device (CPLD), FPGA, general purpose processor, controller, MCU, MPU, or other electronic components for performing the foregoing methods.

The present disclosure is described with reference to flowcharts and/or block diagrams of methods, devices (systems) and computer program products according to the embodiments of the present disclosure. It should be understood that each flow and/or block in the flowchart and/or block diagram, as well as combinations of the flow and/or block in the flowchart and/or block diagram, may be implemented by computer program instructions. These computer program instructions may be provided to a processor of a general purpose computer, a special purpose computer, an embedded processor, or other programmable data processing device to generate a machine, such that instructions executed by a processor of a computer or other programmable data processing device generate apparatus for performing the functions specified in one or more flow in the flowchart and/or one or more blocks in the block diagram.

These computer program instructions may also be stored in a computer readable memory that directs a computer or other programmable data processing device to operate in a specific manner, so that the instructions stored in such computer readable memory produce manufactured goods including the instruction device, the instruction device implements the functions specified in one or more flow in the flowchart and/or one or more blocks in the block diagram.

These computer program instructions may also be loaded onto a computer or other programmable data processing device, such that a series of operational steps are executed on a computer or other programmable device to produce a computer-implemented process, such that instructions executed on the computer or other programmable device provide operations for implementing the functions specified in one or more flow in the flowchart and/or one or more blocks in the block diagram.

It should be understood that the terms "system" and "network" in the present disclosure are often used interchangeably herein. In the present disclosure, the term "and/or" is used to describe an association relationship of associated objects, and represents that there may be three relationships. For example, A and/or B may represent the following three situations: i.e., independent existence of A, existence of both A and B and independent existence of B. In addition, the character "/" in the present disclosure generally represents that an "or" relationship is formed between the previous and next associated objects.

The above describes is merely the preferred embodiments of the disclosure, and is not intended to limit the disclosure. Any modifications, replacements and improvements made within the spirit and principles of the disclosure shall fall within the scope of protection of the disclosure.

The invention claimed is:

1. A method for a channel transmission, comprising:

determining, by a terminal device, a number of time domain units mapped by a first transmission block according to a protocol, information received by the terminal device, a transmission parameter for the first transmission block, a joint channel estimation window length and a slot structure;

wherein a first information field in the information received by the terminal device is used to indicate the number of time domain units mapped by the first transmission block; and a bit value of the first information field is the number of time domain units mapped by the first transmission block.

2. The method of claim 1, wherein the information received by the terminal device comprises at least one of:

Downlink Control Information (DCI), a Radio Resource Control (RRC) signaling or a Media Access Control Control Element (MAC CE).

3. The method of claim 1, wherein a time domain unit comprises a slot.

4. The method of claim 1, wherein the first transmission block is carried on at least one of a Physical Uplink Shared Channel (PUSCH) or a Physical Downlink Shared Channel (PDSCH).

5. The method of claim 1, further comprising:

determining, by the terminal device, whether to map the first transmission block to at least two time domain units according to the number of time domain units.

6. The method of claim 1, further comprising:

determining, by the terminal device, whether to map the first transmission block to at least two time domain units according to received indication information.

7. A terminal device, comprising:

a first processor, configured to determine a number of time domain units mapped by a first transmission block according to a protocol, information received by the terminal device, a transmission parameter for the first transmission block, a joint channel estimation window length and a slot structure;

wherein a first information field in the information received by the terminal device is used to indicate the number of time domain units mapped by the first transmission block; and a bit value of the first information field is the number of time domain units mapped by the first transmission block.

8. The terminal device of claim 7, wherein the first processor is further configured to determine whether to map the first transmission block to at least two time domain units according to the number of time domain units.

9. The terminal device of claim 7, wherein the first processor is further configured to determine whether to map the first transmission block to at least two time domain units according to received indication information.

10. A network device, comprising:

a second processor, configured to determine a number of time domain units mapped by a first transmission block according to a protocol, a transmission parameter for the first transmission block, a joint channel estimation window length and a slot structure;

a first transmitter, configured to transmit information to a terminal device, wherein a first information field in the information is used for the terminal device to determine the number of time domain units mapped by the first transmission block; and a bit value of the first information field is the number of time domain units mapped by the first transmission block.

11. The network device of claim 10, wherein the information comprises at least one of:

Downlink Control Information (DCI), a Radio Resource Control (RRC) signaling and a Media Access Control Control Element (MAC CE).

12. The network device of claim 10, wherein a time domain unit comprises a slot.

13. The network device of claim 10, wherein the second processor is further configured to determine whether to map the first transmission block to at least two time domain units according to the number of time domain units.

* * * * *